(12) United States Patent
Bansal et al.

(10) Patent No.: US 8,437,029 B2
(45) Date of Patent: *May 7, 2013

(54) METHOD AND APPARATUS FOR ASSIGNING CANDIDATE PROCESSING NODES IN A STREAM-ORIENTED COMPUTER SYSTEM

(75) Inventors: Nikhil Bansal, Yorktown Heights, NY (US); James R. H. Challenger, Garrison, NY (US); Lisa Karen Fleischer, Ossining, NY (US); Oktay Gunluk, New York, NY (US); Kirsten Weale Hildrum, Hawthorne, NY (US); Richard P King, Scarsdale, NY (US); Deepak Rajan, Fishkill, NY (US); David Tao, Glen Burnie, MD (US); Joel Leonard Wolf, Katonah, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,167

(22) Filed: Jun. 15, 2011

(65) Prior Publication Data

US 2011/0246999 A1    Oct. 6, 2011

Related U.S. Application Data

(60) Division of application No. 12/132,035, filed on Jun. 3, 2008, now Pat. No. 8,018,614, which is a continuation of application No. 11/374,399, filed on Mar. 13, 2006, now Pat. No. 7,738,129.

(51) Int. Cl.
*G06F 3/12*    (2006.01)
*G06F 9/46*    (2006.01)

(52) U.S. Cl.
USPC ......... 358/1.15; 718/102; 718/103; 718/104; 718/105

(58) Field of Classification Search ................ None
See application file for complete search history.

(56) References Cited

U.S. PATENT DOCUMENTS

| 6,230,303 B1 * | 5/2001 | Dave ........................... 716/105 |
| 7,738,129 B2 * | 6/2010 | Bansal et al. .................. 358/1.15 |
| 7,853,949 B2 | 12/2010 | Bansal | |
| 2010/0242042 A1 | 9/2010 | Bansal | |

OTHER PUBLICATIONS

T. Ibaraki, et al., "Resource Allocation Problems, Algorithmic Approaches", The MIT Press, London, England, 1988 (2 pages).
D. Bertsimas, et al., "Introduction to Linear Optimization", Athena Scientific, Belmont, MA, 1977 (2 pages).
Cormen, et al., "Introduction to ALgoritithms", The MIT Press, Cambridge, MA, sixth printing, 1992, (2 pages).
Ravindra K. Ahuja, et al., "Network Flows, Theory, Algorithms, and Applications", Prentice Hall, Englewood Cliffs, NJ, 1993 (2 pages).

* cited by examiner

*Primary Examiner* — Thierry Pham
(74) *Attorney, Agent, or Firm* — Tutunjian & Bitetto, P.C.; William Stock

(57) ABSTRACT

A method of choosing jobs to run in a stream based distributed computer system includes determining jobs to be run in a distributed stream-oriented system by deciding a priority threshold above which jobs will be accepted, below which jobs will be rejected. Overall importance is maximized relative to the priority threshold based on importance values assigned to all jobs. System constraints are applied to ensure jobs meet set criteria.

19 Claims, 9 Drawing Sheets

METHOD AND APPARATUS FOR ASSIGNING CANDIDATE PROCESSING NODES IN A STREAM-ORIENTED COMPUTER SYSTEM

RELATED APPLICATIONS INFORMATION

This application is a divisional of application Ser. No. 12/132,035, filed Jun. 3, 2008, which is incorporated by reference herein in its entirety and which is a continuation of U.S. Pat. No. 7,738,129, issued Jun. 15, 2010, which is incorporated by reference herein in its entirety.

GOVERNMENT RIGHTS

This invention was made with Government support under Contract No.: TIA H98230-04-3-0001 awarded by the U.S. Department of Defense. The Government has certain rights in this invention.

BACKGROUND

1. Technical Field

The present invention relates generally to scheduling work in a stream-based distributed computer system, and more particularly, to systems and methods for deciding which jobs to perform, which templates from those jobs to select, and how to choose candidate processing nodes for the processing elements in those jobs in a manner which optimizes the importance of the work in the system, results in good network utilization, meets a variety of practical constraints, and is robust with respect to dynamic changes in the system over time.

2. Description of the Related Art

Distributed computer systems designed specifically to handle very large-scale stream processing jobs are in their infancy. Several early examples augment relational databases with streaming operations. Distributed stream processing systems are likely to become very common in the relatively near future, and are expected to be employed in highly scalable distributed computer systems to handle complex jobs involving enormous quantities of streaming data.

In particular, systems including tens of thousands of processing nodes able to concurrently support hundreds of thousands of incoming and derived streams may be employed. These systems may have storage subsystems with a capacity of multiple petabytes.

Even at these sizes, streaming systems are expected to be essentially swamped at almost all times. Processors will be nearly fully utilized, and the offered load (in terms of jobs) will far exceed the prodigious processing power capabilities of the systems, and the storage subsystems will be virtually full. Such goals make the design of future systems enormously challenging.

Focusing on the scheduling of work in such a streaming system, it is clear that an effective optimization method is needed to use the system properly. Consider the complexity of the scheduling problem as follows.

Referring to FIG. 1, a conceptual system is depicted for scheduling typical jobs. Each job 1-9 includes one or more alternative directed graphs 12 with nodes 14 and directed arcs 16. For example, job 8 has two alternative implementations, called templates. The nodes correspond to tasks (which may be called processing elements, or PEs), interconnected by directed arcs (streams). The streams may be either primal (incoming) or derived (produced by the PEs). The jobs themselves may be interconnected in complex ways by means of derived streams. For example, jobs 2, 3 and 8 are connected.

Referring to FIG. 2, a typical distributed computer system 11 is shown. Processing nodes 13 (or PNs) are interconnected by a network 19.

One problem includes the scheduling of work in a stream-oriented computer system in a manner which maximizes the overall importance of the work performed. The streams serve as a transport mechanism between the various processing elements doing the work in the system. These connections can be arbitrarily complex. The system is typically overloaded and can include many processing nodes. Importance of the various work items can change frequently and dramatically. Processing elements may perform continual and other, more traditional work as well. There are no known solutions to this problem.

SUMMARY

A scheduler needs to perform each of the following functions: (1) decide which jobs to perform in a system; (2) decide, for each such performed job, which template to select; (3) fractionally assign the PEs in those jobs to the PNs. In other words, it should overlay the PEs of the performed jobs onto the PNs of the computer system, and should overlay the streams of those jobs onto the network of the computer system; and (4) attempt to maximize a measure of the utility of the streams produced by those jobs.

The following practical issues make it difficult for a scheduler to provide this functionality effectively.

First, the offered load may typically exceed the system capacity by large amounts. Thus all system components, including the PNs, should be made to run at nearly full capacity nearly all the time. A lack of spare capacity means that there is no room for error.

Second, stream-based jobs have a real-time time scale. Only one shot is available at most primal streams, so it is crucial to make the correct decision on which jobs to run. There are multiple step jobs where numerous PEs are interconnected in complex, changeable configurations via bursty streams, just as multiple jobs are glued together. Flow imbalances, which are likely if scheduling is not done precisely, can lead to buffer overflows (and loss of data), or to underutilization of PEs.

Third, one needs the capability of dynamic rebalancing of resources for jobs, because the importance of the output they produce changes frequently and dramatically. For example, discoveries, new and departing queries and the like can cause major shifts in resource allocation. These changes must be made quickly. Primal streams may come and go unpredictably.

Fourth, there will typically be lots of special and critical requirements on the scheduler of such a system, for instance, priority, resource matching, licensing, security, privacy, uniformity, temporal, fixed point and incremental constraints.

Fifth, given a system running at near capacity, it is even more important than usual to optimize the proximity of the interconnected PE pairs as well as the distance between PEs and storage. Thus, for example, logically close PEs should be assigned to physically close PNs.

These competing difficulties make the finding of high quality schedules very daunting. There is presently no known prior art describing schedulers meeting these design objectives. It will be apparent to those skilled in the art that no simple heuristic scheduling method will work satisfactorily for stream-based computer systems of this kind. There are simply too many different aspects that need to be balanced against each other.

Accordingly, aspects of a three-level hierarchical method which creates high quality schedules in a distributed stream-based environment will be described. The hierarchy is temporal in nature. As the level in the hierarchy increases, the difficulty in solving the problem also increases. However, more time to solve the problem is provided as well. Furthermore, the solution to a higher level problem makes the next lower level problem more manageable. The three levels, from top to bottom, may be referred to for simplicity as the macro, micro and nano models respectively.

Three hierarchically organized methods, which, taken together, provide the full functionality described above. The present invention describes one of these three methods, and in particular is directed to the macro model. The macro model creates a list of jobs that will be performed, a list of which template alternative will be chosen to execute that job, and a list of candidate processing nodes (PNs) for each of the processing elements (PEs) in those templates.

The present invention is an epoch-based method for choosing jobs, making job template decisions and creating a list of candidate processing nodes (PNs) for each of the processing elements (PEs) in those templates in a distributed stream-oriented computer system. The method is given a metric describing the importance of the streams, job priorities, and also security, licensing, resource matching and other rules for what constitutes an acceptable set of candidate PNs for a PE, as well as a description of the current candidate nodes, a list of those candidate nodes which cannot be modified from their current values, and rules for the maximum amount of change permitted to these candidate nodes. The time unit for the method is a macro epoch—on order of a half hour.

In one embodiment, an apparatus and method for making candidate node assignments of processing elements to processing nodes for stream-based applications in a distributed computer system includes determining an amount of processing power to give to each processing element. To update the job choices, template choices allocations of processing power and the candidate nodes, the process is repeated.

A method of choosing jobs to run in a stream based distributed computer system includes determining jobs to be run in a distributed stream-oriented system in accordance with a priority threshold above which jobs will be accepted, below which jobs will be rejected, to maximize projected importance by deciding with a processor which jobs to run, and which templates among running jobs to choose and allocating appropriate processing power to processing elements in the templates of the running jobs.

Another method of choosing jobs to run in a stream based distributed computer system includes determining jobs to be run in a distributed stream-oriented system in accordance with a priority threshold above which jobs will be accepted, below which jobs will be rejected, to maximize projected importance responsive to changing importance by deciding with a processor which jobs to run, and which templates among running jobs to choose and allocating appropriate processing power to processing elements in the templates of the running jobs.

A system for scheduling stream-based applications in a distributed computer system includes a scheduler configured to schedule work using a macro method configured to determine jobs to be run in a distributed stream-oriented system in accordance with a priority threshold above which jobs will be accepted, below which jobs will be rejected, to maximize projected importance. The macro method includes a quantity component including a processor configured to maximize importance by deciding which jobs to run, and which templates among running jobs to choose. The macro method includes a where component configured to allocate appropriate processing power to processing elements in the templates of the running jobs.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
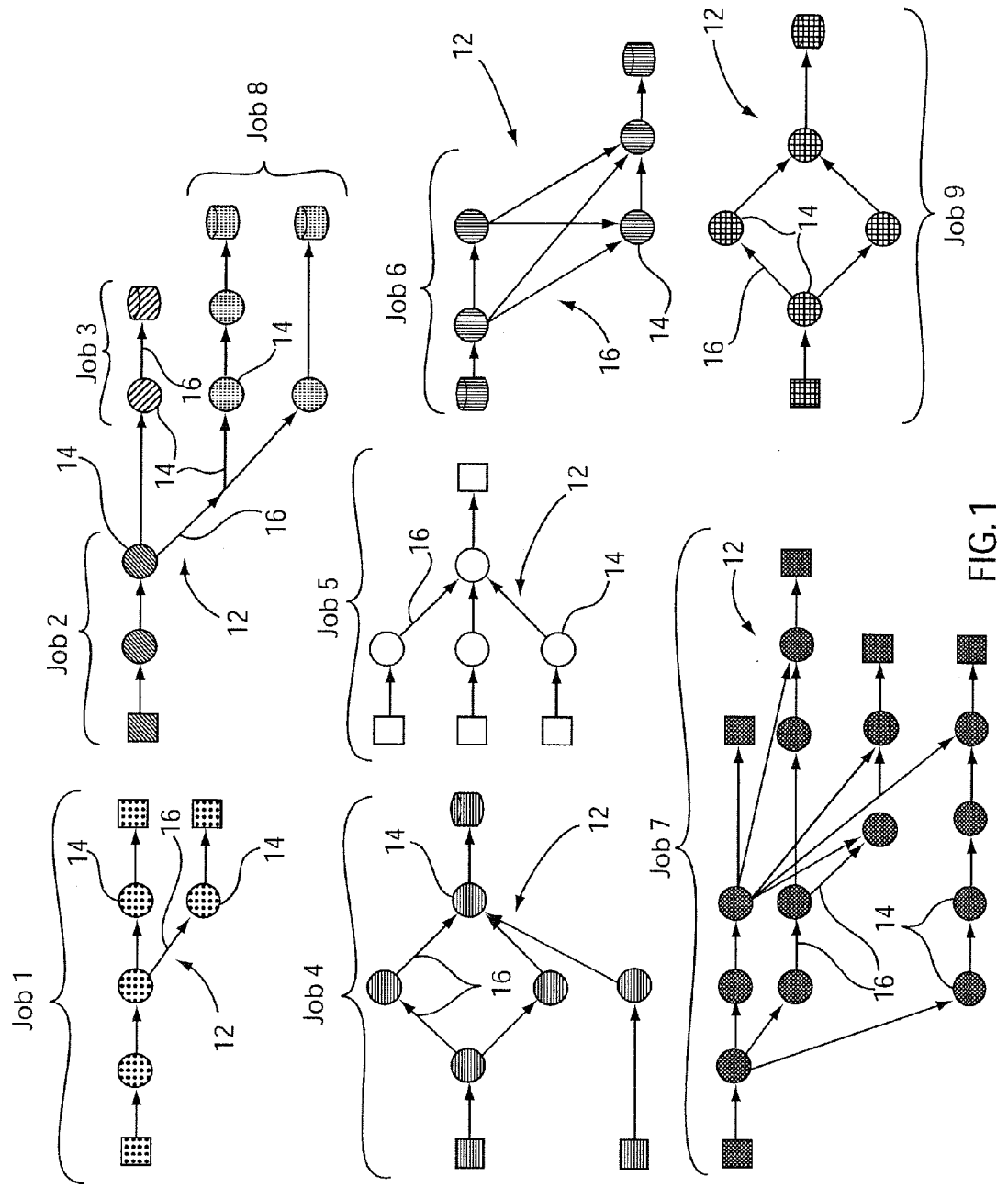
FIG. 1 depicts an example of a collection of jobs, including alternative templates, processing elements and streams.
Figure 2:
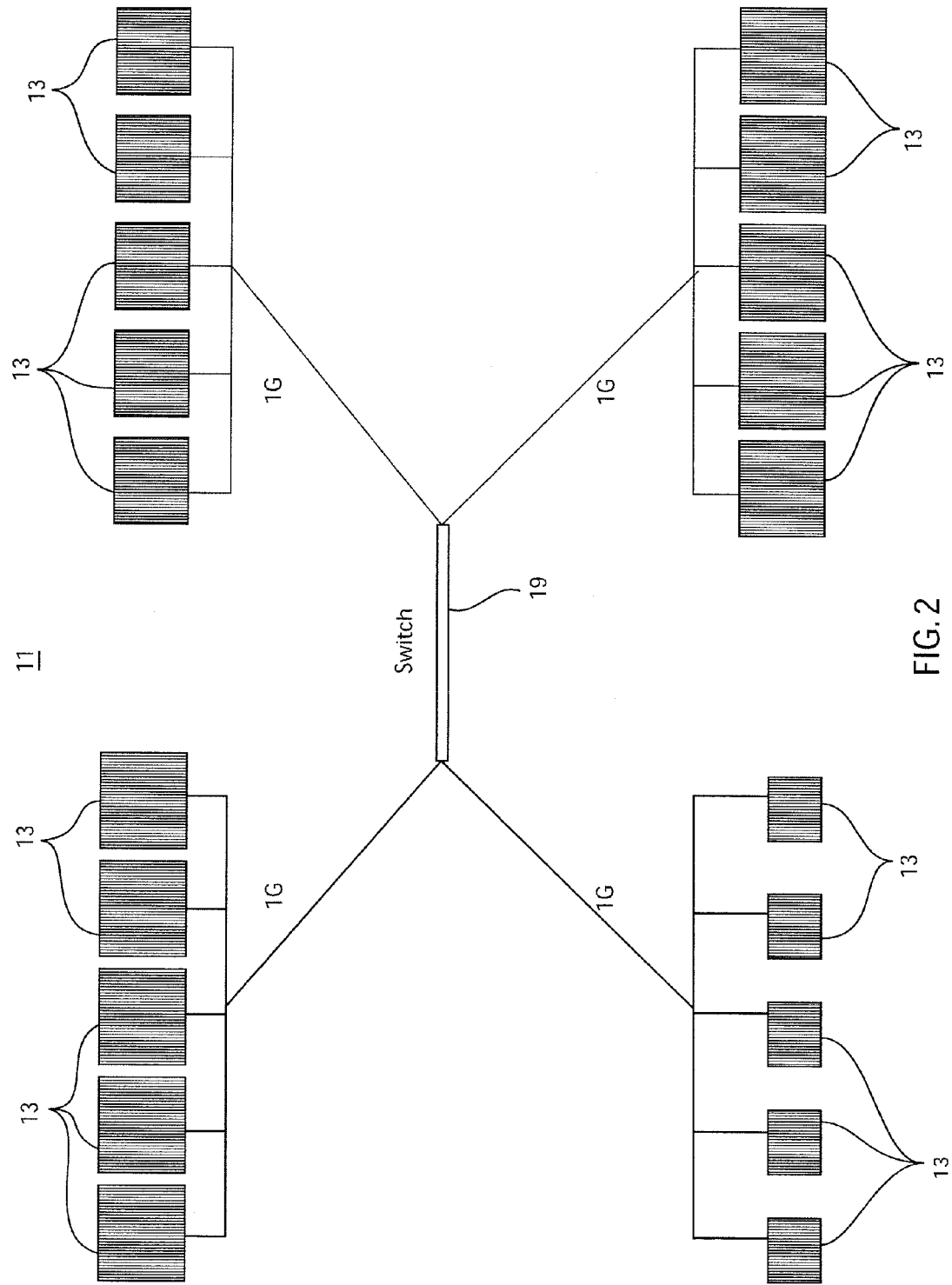
FIG. 2 depicts an example of processing nodes and a network of a distributed stream-based system including switches.

Embodiments of the present invention include an epoch-based system and method for choosing jobs, making job template decisions and creating a list of candidate processing nodes (PNs) for each of the processing elements (PEs) in those templates in a distributed stream-oriented computer system. In one particularly useful embodiment the method is given a metric describing the importance of the streams, job priorities, and also security, licensing, resource matching and other rules for what constitutes an acceptable set of candidate PNs for a PE. A description of the current candidate nodes, a list of those candidate nodes which cannot be modified from their current values, and rules for the maximum amount of change permitted to these candidate nodes may also be included.

A hierarchical scheduler for distributed computer systems is particularly useful for stream-based applications. The scheduler attempts to maximize the importance of all work in the system, subject to a large number of constraints of varying importance. The scheduler includes two or more methods and distinct temporal levels.

In one embodiment, three major methods at three distinct temporal levels are employed. The distinct temporal levels may be referred to as macro, micro and nano models or levels, respectively.

The time unit for the micro model is a micro epoch, e.g., on order of minutes. The input to the micro model may include a list of which jobs will run, a choice of one of potentially multiple alternative templates for running the job, and the lists of candidate processing nodes for each processing element that will run, as given by the macro model. The output is a set of fractional allocations of processing elements to processing nodes.

The nano model makes decisions every few seconds, e.g., about two orders of magnitude less than a micro epoch. One goal of the nano model is to implement flow balancing decisions of the micro model at a much finer temporal level, dealing with burstiness and the differences between expected and achieved progress. Such issues can lead to flooding of stream buffers and/or starvation of downstream processing elements.

Although the macro model works well in the hierarchical system, the macro model may be employed independently as well. A time scale or unit for the method is a macro epoch, which is for example on the order of a half hour. The output choices of jobs, templates and candidate node assignments obey described rules.

In one embodiment, a 'quantity' stage and a 'where' stage are provided for the macro model. The macro model works well when used in conjunction with a micro model and nano model in a hierarchically processed temporal system where scheduling work is performed through temporal epochs which are related to the processing resources needed to arrive at a solution. The output of the macro model includes job choices, template choices and candidate assignments of processing elements (PEs) to processing nodes (PNs).

A commonly assigned disclosure, filed Mar. 13, 2006 as application Ser. No. 11/374,192, entitled: METHOD AND APPARATUS FOR SCHEDULING WORK IN A STREAM-ORIENTED COMPUTER SYSTEM, Attorney Docket Number YOR920050582US1 (163-112) is hereby incorporated by reference. This disclosure describes the scheduler in greater detail.

A commonly assigned disclosure, filed Mar. 13, 2006 as application Ser. No. 11/374,643, entitled: METHOD AND APPARATUS FOR ASSIGNING FRACTIONAL PROCESSING NODES TO WORK IN A STREAM-ORIENTED COMPUTER SYSTEM, is hereby incorporated by reference. This disclosure describes the micro method in greater detail.

The present disclosure employs a number of new concepts, which are now illustratively introduced.

Value function: Each derived stream produced by a job will have a value function associated with it. This is an arbitrary real-valued function whose domain is a cross product from a list of metrics such as rate, quality, input stream consumption, input stream age, completion time and so on. The resources assigned to the upstream PEs can be mapped to the domain of this value function via the iterative composition of so-called resource learning functions, one for each derived stream produced by such a PE. Each resource learning function maps the cross products of the value function domains of each derived stream consumed by the PE with the resource given to that PE into the value function domain of the produced stream. A value function of 0 is completely acceptable. In particular, it is expected that a majority of intermediate streams will have value functions of 0. Most of the value of the system will generally be placed on the final streams. Nevertheless, the invention is designed to be completely general with regard to value functions.

Learning Function: Each resource learning function maps the cross products of the value function domains of each derived stream consumed by the PE with the resource given to that PE into the value function domain of the produced stream.

A value function of 0 is completely acceptable. In particular, it is expected that a majority of intermediate streams will have value functions of 0. Most of the value of the system will generally be placed on the final streams. Nevertheless, the present invention is designed to be completely general with regard to value functions.

Weight: Each derived stream produced by a job will have a weight associated with it. This weight may be the sum and product of multiple weight terms. One summand might arise from the job which produces the stream and others might arise from the jobs which consume the stream if they are performed. Each summand might be the product of a "static" term and a "dynamic" term. The "static" term might change only at weight epochs (on the order of months), while the "dynamic" term might change quite frequently in response to discoveries in the running of the computer system. Weights of 0 are perfectly acceptable, and changing weights from and to 0 facilitate the turning on and off of subjobs. If the value function of a stream is 0, the weight of that stream can be assumed to be 0 as well.

Importance: Each derived stream produced by a job has an importance which is the weighted value. The summation of this importance over all derived streams is the overall importance being produced by the computer system, and this is one quantity that present embodiments attempt to optimize.

Priority Number: Each job in the computer system has a priority number which is effectively used to determine whether the job should be run at some positive level of resource consumption. The importance, on the other hand, determines the amount of resources to be allocated to each job that will be run.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
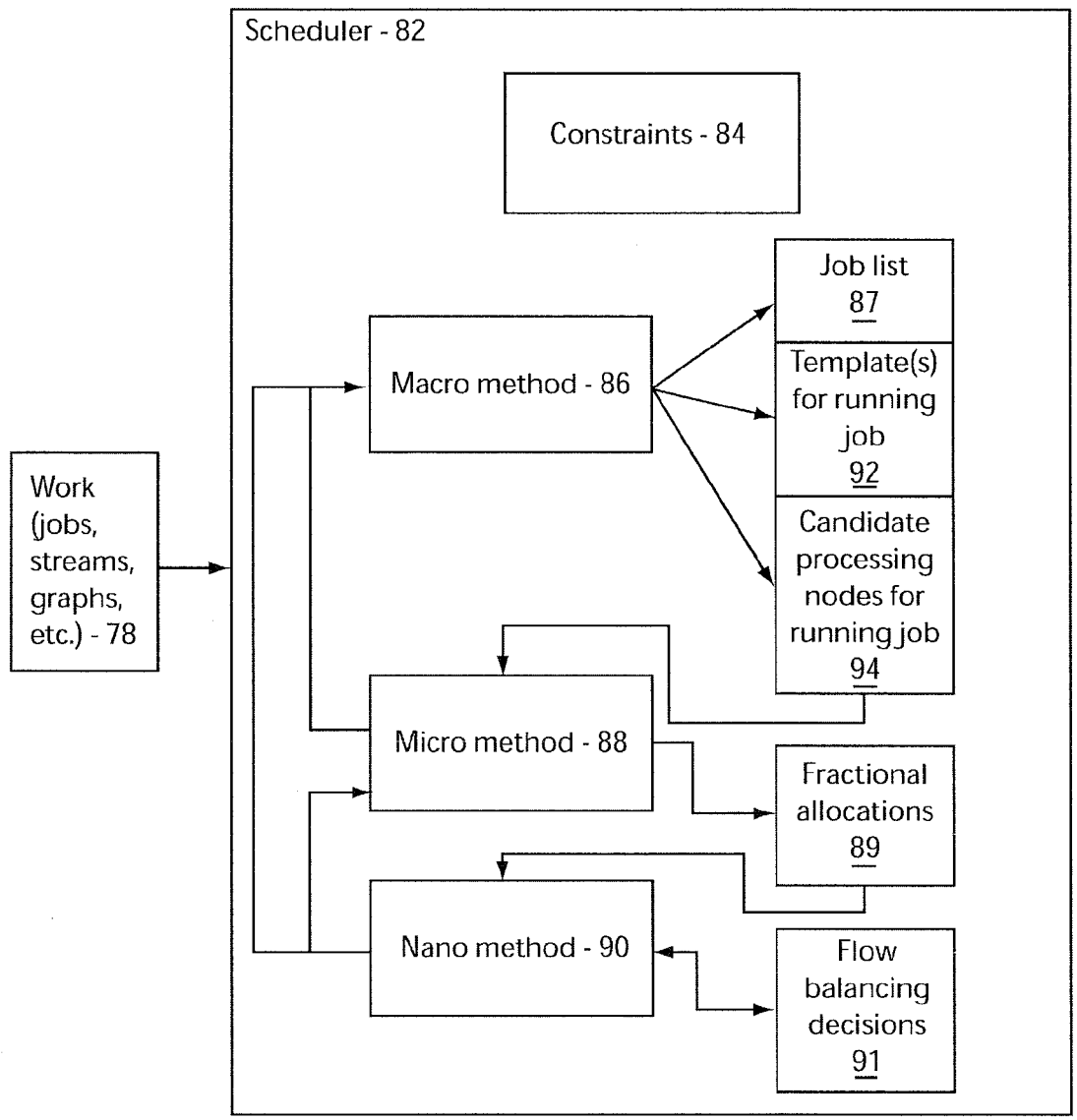
FIG. 3 is a block/flow diagram illustratively showing a scheduler in accordance with one embodiment.

Referring now to the drawings in which like numerals represent the same or similar elements and initially to FIG. 3, a block/flow diagram shows an illustrative system 80. System 80 includes a hierarchically designed scheduler 82 for distributed computer systems designed for stream-based applications. The scheduler 82 attempts to maximize the importance of all work in the system, subject to a large number of constraints 84. The scheduler includes three major methods at three distinct temporal levels. These are known as the macro 86, micro 88 and nano 90 models or modules, respectively.

The scheduler 82 receives templates, data, graphs, streams or any other schema representing jobs/applications to be performed by system 80. The scheduler 82 employs the constraints and the hierarchical methods to provide a solution the scheduling problems presented using the three temporal regimes as explained hereinafter.

Beginning with the macro method/model 86, constraints 84 or other criteria are employed to permit the best scheduling of tasks. The macro method 86 performs the most difficult scheduling tasks. The output of the macro model 86 is a list 87 of which jobs will run, a choice of one of potentially multiple alternative templates 92 for running the job, and the lists of candidate processing nodes 94 for each processing element that will run. The output of the micro model 88 includes fractional allocations 89 of processing elements to processing nodes based on the decisions of the macro model 86.

The nano model 90 implements flow balancing decisions 91 of the micro model 88 at a much finer temporal level, dealing with burstiness and the differences between expected and achieved progress.

At a highest temporal level (macro), the jobs that will run, the best template alternative for those jobs that will run, and candidate processing nodes for the processing elements of the best template for each running job are selected to maximize the importance of the work performed by the system. At a medium temporal level (micro) fractional allocations and reallocations of processing elements are made to processing nodes in the system to react to changing importance of the work.

At a lowest temporal level (nano), the fractional allocations are revised on a nearly continual basis to react to the burstiness of the work, and to differences between projected and real progress. The steps are repeated through the process. The ability to manage the utilization of time at the highest and medium temporal level, and the ability to handle new and updated scheduler input data in a timely manner are provided.

Figure 4:
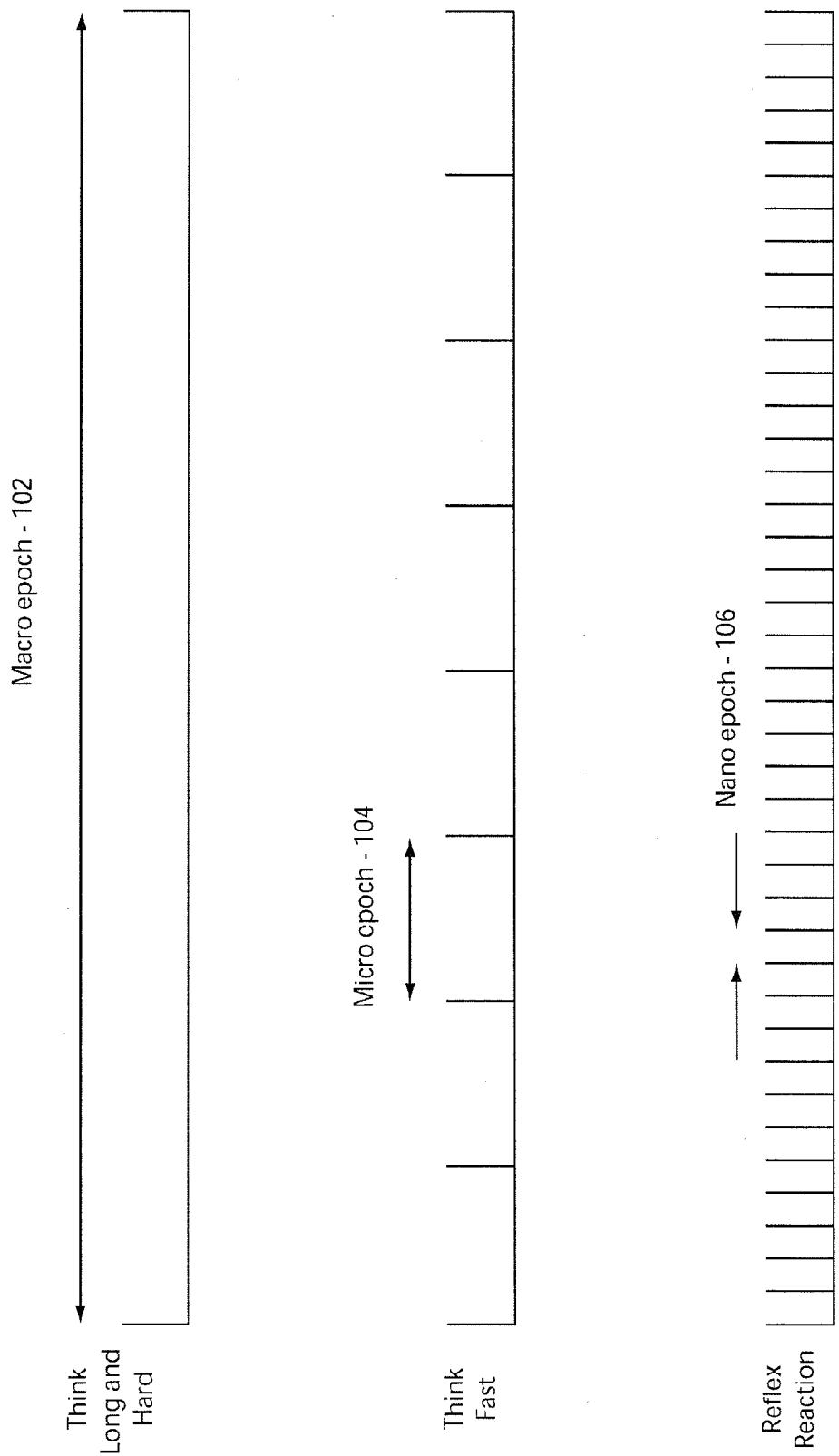
FIG. 4 depicts three distinct temporal levels of the three epoch-based models referred to as macro, micro and nano epochs.

Referring to FIG. 4, three distinct time epochs, and the relationships between three distinct models are illustratively shown. The time epochs includes a macro epoch 102, a micro epoch 104 and a nano epoch 106. Note that each macro epoch 102 is composed of multiple micro epochs 104, and that each micro epoch 104 is composed of multiple nano epochs 106. The macro model 86 (FIG. 3) has sufficient time to "think long and hard". The micro model 88 (FIG. 3) only has time to "think fast". The nano model 90 (FIG. 3) effectively involves "reflex reactions".

The scheduling problem is decomposed into these levels (102, 104, 106) because different aspects of the problem need different amounts of think times. Present embodiments more effectively employ resources by solving the scheduling problem with an appropriate amount of resources.

Figure 5:
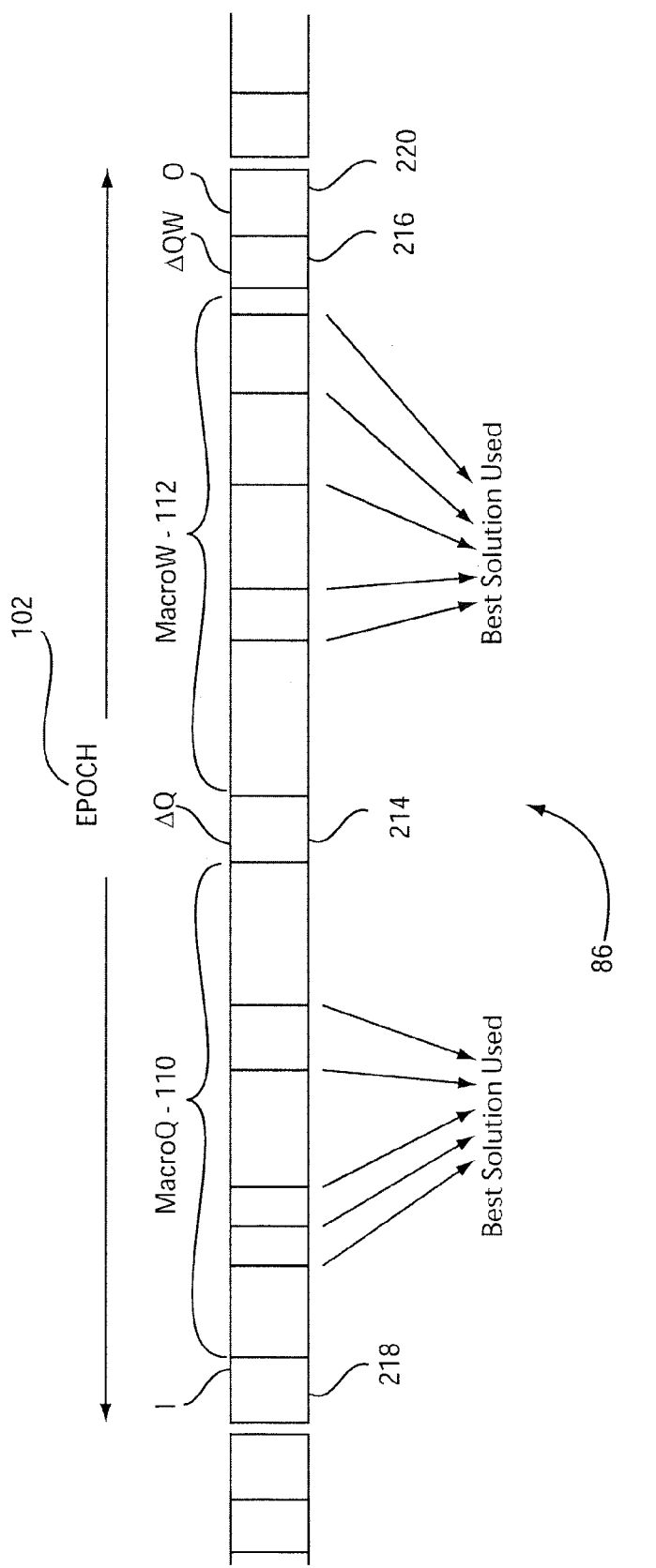
FIG. 5 depicts the decomposition of the macro epoch into its six component times, including times for an input module, a macroQ module, an optional $\Delta Q$ module, a macroW module, an optional $\Delta QW$ module and an output implementation module.

Referring to FIG. 5, a macro model 86 has two major methods, which are preferably executed sequentially. These are referred to as MacroQuantity (macroQ) and MacroWhere (macroW) modules, 210 and 212, respectively. These two modules 210 and 212 can be described as follows.

MacroQ 210 is the 'quantity' component of the macro model 86. MacroQ 210 maximizes projected importance by deciding which jobs to run, which templates amongst the running jobs to choose, and by allocating appropriate processing power, in million instructions per second (mips), to each processing element in the templates of the running jobs. Embodiments of the present invention employ a combination of the dynamic programming and resource allocation problem techniques.

MacroW 212 is the 'where' component of the macro model 86. MacroW 212 determines candidate processing node assignments for the processing elements in the templates of the running jobs based on the output from the macroQ module 210, subject to incremental, security, licensing, resource matching and other constraints. Embodiments of the present invention may employ integer linear programming inspired and other heuristic techniques.

The manner in which the macro model is decoupled is illustratively demonstrated. There are two sequential methods 210 and 212, plus an input module (I) 218 and an output implementation module (O) 220. There are also two optional 'Δ' models, ΔQ 214 and ΔQW 216, which permit for updates and/or corrections in the input data for the two sequential methods 210 and 212, by revising the output of these two methods incrementally to accommodate changes. The present embodiment describes the two decoupled sequential methods below.

MacroQ 210 maximizes projected importance by deciding which jobs to run, which templates amongst the running jobs to choose, and by allocating appropriate processing power, in mips, to each processing element in the templates of the running jobs. Aspects of the present invention employ a combination of the dynamic programming and resource allocation problem techniques.

MacroW 212 determines candidate processing node assignments for the processing elements in the templates of the running jobs based on the output from the macroQ module 210, subject to incremental, security, licensing, resource matching and other constraints. Aspects of the present invention employ integer linear programming inspired and other heuristic techniques.

The output at output module 228 is a list of which jobs to run in a distributed stream-oriented computer system, a decision of which template to choose for those jobs, and a list of candidate processing nodes to handle the processing elements of those jobs. The goal of the last output of the macro model is to assist a micro model to handle variability in the relative importance of work, changes in the state of the system, changes in the job lists, changes in the job stages, without having to consider the difficult constraints handled in the present invention. Network utilization is minimized in the process, by optimizing the proximity of the processing elements.

MacroQ 210 is the 'quantity' component of the macro model 86. MacroQ 210 maximizes projected importance by deciding which jobs to do, which templates to choose, and computing flow balanced PE processing allocation goals, subject to job priorities. MacroQ 210 employs a combination of dynamic programming, non-serial dynamic programming, and other resource allocation problem techniques.

MacroW 212 is the 'where' component of the macro model 86. MacroW 212 minimizes projected network traffic, allocating uniformly more candidate nodes than PEs goals dictate, subject to incremental, resource matching, licensing, security and other constraints. MacroW 212 employs integer and mixed integer programming techniques.

MacroQuantity Model (MacroQ)

Introduction: The macroQ model 210 finds a set of jobs to run during the current macro epoch. Within each job macro model 86 chooses an "optimal" template from a list of templates given to it. Each template represents an alternative plan for performing a job using certain processing elements (PEs), and using or creating certain streams. The jobs have so-called priorities, and the jobs actually run respect an appropriate priority constraint to be described below. One goal of the macroQ model 210 is to maximize the cumulative importance of the streams produced by the winning jobs and templates. In the process of solving the problem, macroQ model 210 computes the optimal importance, the list of job and template choices, and finally the set of processing power goals, measured in millions of instructions per second (mips) for each of the PEs within the chosen list. This can be formalized using the following notation.

Let J denote the number of jobs being considered, indexed by j. Each job j has a priority $\pi_j$, a positive integer. The convention is that lower numbers indicate higher priorities. Thus, the highest possible priority is 1. Each job j comes with a small number of possible job templates. This number may be 1. It will be 1 if the job has already been instantiated, because the choice of a template is fixed throughout the "lifetime" of a job. It is, however, the role of the macroQ model 210 to make this choice for jobs that are not yet instantiated.

Let $N_j$ denote the number of templates for job j, indexed by t. Any subset $\mathscr{J}$ of $\{1, \ldots, J\}$ will be called a job list. For each job list $\mathscr{J}$ a function T from $\mathscr{J}$ to the positive integers satisfying $T(j) \leq N_j$ for all j will be called a template list. Denote the set of all template lists for $\mathscr{J}$ by $\mathscr{T}(\mathscr{J})$. Finally, define the job/template list to be the set $\mathscr{L} = \{(\mathscr{J}, T) | T \in \mathscr{T}(\mathscr{J})\}$.

A major function of macroQ 210 is to make a "legal and optimal" choice of a job/template list. Each job/template list gives rise to a directed acyclic graph $D(\mathscr{J}, T)$ whose nodes $P(\mathscr{J}, T)$ are the PEs in the template and whose directed arcs are the streams. (This digraph is "glued" together from the templates of the various jobs in the list in a manner which will be known to those skilled in the art.) The PE nodes may come from multiple jobs.) Assigning length one to each of the directed arcs, there is an obvious notion of an asymmetric distance function d between pairs of relevant PEs. Note that $d(p, q) < \infty$ means that PE p precedes PE q, or, equivalently, that q depends on p.

Let $D(\mathscr{J}, T, p)$ denote the set of PEs q in $D(\mathscr{J}, T)$ for which q depends on p. This notion of dependence gives rise, in turn, to the notion of dependence between the relevant jobs: Given jobs j and j', j' depends on j provided there exist PEs q and p belonging to j' and j, respectively, for which $d(p, q) < \infty$. Let $D(\mathscr{J}, T)[j]$ denote the set of jobs j' for which j' depends on j. Now define a revised job priority notion based on a particular job/template list $\{(\mathscr{J}, T)$ by setting $\bar{\pi}_j$ equal to the minimum, over all j' in $D(\mathscr{J}, T)[j]$ of $\pi_j$ if j is in $\mathscr{J}$, and $\pi_j$ otherwise.

Those skilled in the art will realize that this is well-defined. Now define the notion of a legal job/template list ($\mathscr{J}$, T). For such a list one insists that j in $\mathscr{J}$ and j' not in $\mathscr{J}$ implies that $\bar{\pi}_j \leq \bar{\pi}_{j'}$. Let L denote the set of legal job/template lists.

Any stream s associated with a job/template list has a value function. The range of this function is the unit interval [0,1]. A stream, in turn, is created by a unique PE p associated with that job/template list. The PE p gives rise to a set $\{q_l, \ldots, q_{k_p}\}$ of $k_p$ PEs $q_i$ for which p is $D(\mathscr{J}, T, q_i)$. This set includes p itself. There are also notions of learned resource functions which can be recursively composed (unfolded) into a function from the processing power vector $(g_{q_l}, \ldots, g_{q_p})$ to the domain of the value function. (Each of the terms are in millions of instructions per second, or mips.) So the composition of these recursively unfolded functions with the value function yields a mapping $V_s$ from the vector $(g_{q_l}, \ldots, g_{q_p})$ to the unit interval for stream s. This function is known as the composite value function for s. Multiplied by a weight $w_s$ for stream s the composite value function becomes a so-called stream importance function $I_s$ mapping $(g_{q_l}, \ldots, g_{q_p})$ to the non-negative real numbers $[0, \infty)$. Finally, aggregating all the stream importance functions together for all streams which are created by a given PE p yields a PE importance function $I_p$.

Let G denote the total amount of processing power, in mips. Let $m_p$ denote the minimum amount of processing power which can be given to PE p if it is executed. Similarly, let $M_p$ denote the maximum amount of processing power which can be given to PE p if it is executed. Suppose that the set $\bar{J}$ represents the jobs that must be executed.

Objective Function: Seek to maximize the sum of the PE importance functions across all possible legal job/template lists. The objective function, which is to be maximized is therefore $\Sigma I_p(g_{q_l}, \ldots g_{qk_p})$.

Constraints:

$$\Sigma g_p \leq G \qquad (1)$$

$$m_p \leq g_p \leq M_p \qquad (2)$$

$$\bar{J} \subseteq J \qquad (3)$$

Interpretation of the Constraints: Constraint 1 is the resource allocation constraint. Together with the maximization goal constraint 1 ensures that all of the resource is used, if that is possible. (It might not be possible, based, for example, on the second constraint.) Constraint 2 insists a PE p to be within some minimum and maximum range if it is executed. Constraint 3 insists that necessary jobs are executed. The constraint on priorities is implicit in the definition of the problem.

At a high level, a particularly useful embodiment examines each legal job/template list individually, enumerating a potentially large number of resource allocation problems. Within each of these, the embodiment separates the directed graphs into components. Each component can be solved via non-serial dynamic programming. (Those skilled in the art will understand that this is a known optimization tool. See T. Ibaraki and N. Katoh, "Resource Allocation Problems", MIT Press, 1988 for details, henceforth referred to as I&K.) The solutions can then be interpreted as giving importance functions on a component by component basis. These solutions can be merged, either by dynamic programming (in the general case) or by separable concave resource allocation problem schemes (if the component importance functions are concave), or by a combination of both approaches. (See, e.g., I&K.) Concavity is a common case.

Figure 6:
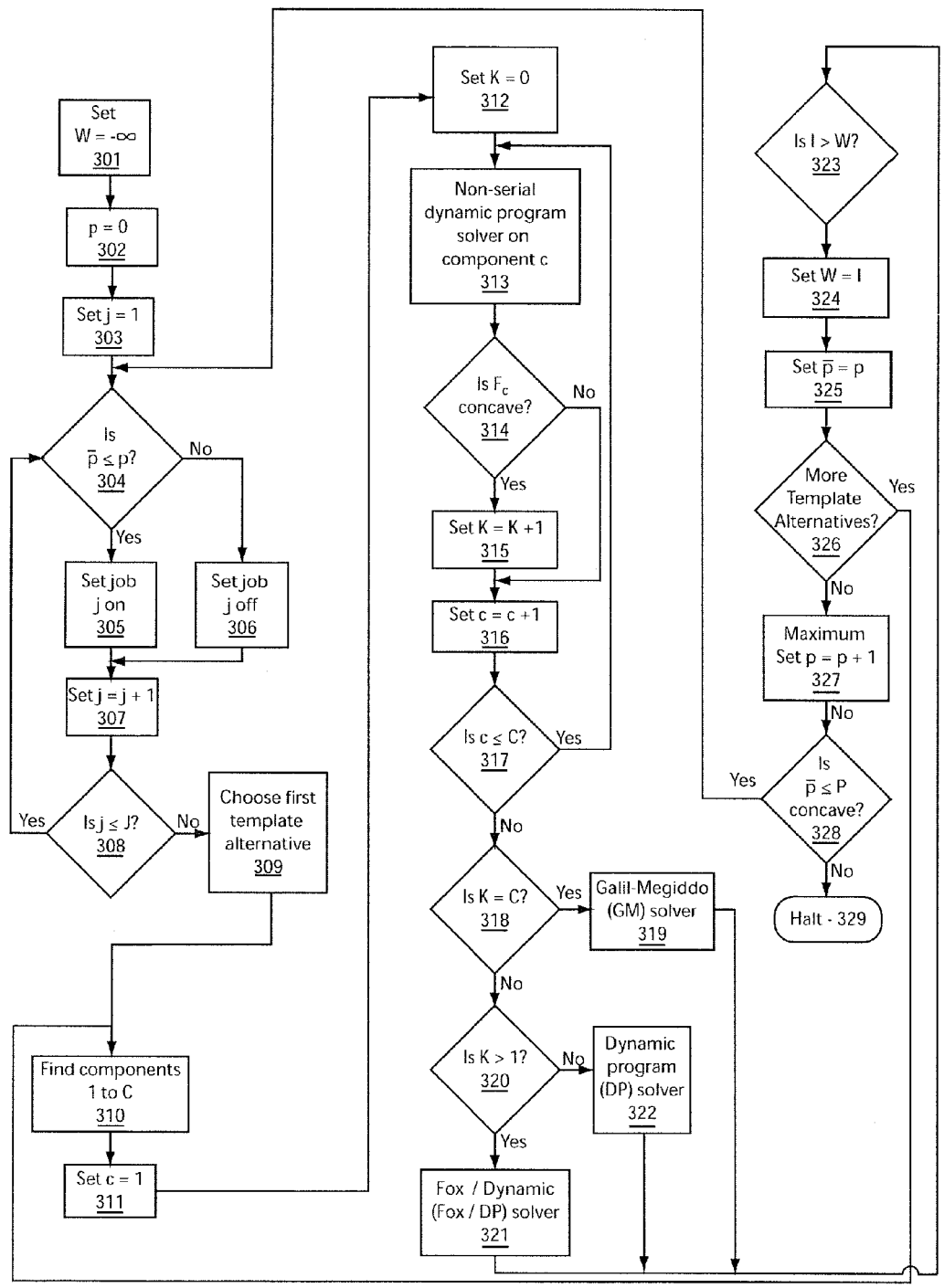
FIG. 6 is a block/flow diagram showing process steps for obtaining a solution for a macroQ module in accordance with an illustrative embodiment.

Referring to FIG. 6, a flowchart of the main components of the macroQ model (210) are illustratively shown. The method/program begins in block 301 by setting the winning importance value W equal to −∞. (In other words, set W to a very small negative number.) In block 302, the method sets p (priority was represented earlier as $\pi$) to be 0. The value p will indicate the level of revised priority, and will determine whether or not a job is tentatively allowed to run. All jobs with priority p or better will be tentatively allowed to run at a given time, and the best solution over all such p will be chosen in the end.

In block 303, j is initialized to 1. In block 304, the method checks to see if the revised priority of the job j is less than or equal to p (In other words, $\overline{\pi}_j \leq p$ or $\overline{p} \leq p$). If the revised priority is less than or equal to p, block 305 sets the job on. If not, block 306 sets the job off. In either case, block 307 increments j by 1. Then, block 308 checks to see if j is less than or equal to J. If j is less than or equal to J, control is returned to block 304. Otherwise, the method proceeds with block 309, which chooses the first template alternative amongst those jobs that are set on.

The method/program then proceeds to block 310, which determines weak components of all PEs in the directed graph of those jobs which are tentatively going to be run. Those skilled in the art will know that finding the weak components of a directed graph is known in the art. See, for example, T. Cormen, C. Leiserson and R. Rivest, "Introduction to Algorithms", McGraw Hill, 1992.

Block 311 then initializes the component c to be 1. In block 312, the method/program sets the number K of concave components equal to 0. Block 313 then runs a non-serial dynamic programming scheme on component c. Those skilled in the art will recognize that this is standard. (See, e.g., I&K.)

Block 314 then tests to see if the resulting importance function $F_c$ of potential mips given to component c is concave. (See e.g., I&K.) If $F_c$ is concave, step 315 increments K by 1, and proceeds to block 316. Step 316 can also be reached if the resulting function is not concave. Block 316 increments c by 1. Then, block 317 checks if c is less than or equal to the number of components C. If c is less than or equal to C, control is returned to block 313. If not, block 318 checks to see if K is equal to C. If K is equal to C, block 319 executes a Galil-Megiddo scheme on the resulting resource allocation problem. If K is not equal to C, block 320 checks to see if K is greater than 1. If K is greater than 1, block 321 executes a combined Fox/Dynamic Programming scheme on the resulting resource allocation problem. If K is not greater than 1, block 322 executes a Dynamic Programming scheme on the resulting resource problem. Those skilled in the art will recognize that resource allocation problems can be solved more efficiently if all of the components are concave, somewhat less efficiently if more than one but less than all of the components are concave, and least efficiently if one or none of the components are concave. The three schemes described (Galil-Megiddo, Fox/Dynamic Programming, Dynamic Programming, which are known in the art,) represent this progression from most efficient to least efficient. (See e.g., I&K.)

At the completion of blocks 319, 321 or 322 control is passed to block 323. There a check is made to see if the resulting total importance I derived from the resource allocation problem is greater than W. If I is greater, block 324 sets W equal to I, and block 325 sets $\overline{p}$ equal to p, where $\overline{p}$ is the revised priority (the revised priority was represented earlier as $\overline{\pi}$). Then, and if I was not greater than W in block 323, control is passed to block 326. This step tests to see if there are more template choices amongst the jobs that are currently set on. If the answer is yes, the method/program returns to block 310. Otherwise, the method/program proceeds to block 327. Block 327 increments p by 1. Then block 328 checks to see if p is less than or equal to the maximum P of all priorities of all the jobs. If it is, control is returned to block 303. If not the macroQ model (210) terminates at block 329 with the optimal solution to the quantity phase.

MacroWhere Model (MacroW)

Introduction: The macroW model (212 in FIG. 5) receives a set of PEs from the macroQ model (210 in FIG. 5). These PEs will ultimately need to be assigned to the processing nodes (PNs) in the computer system. But the environment is very dynamic and the resource requirements of PEs may increase of decrease dramatically over time. If the requirement for a PE increases, the system of the present invention needs to be able to quickly execute the requirement on additional PNs. For this purpose, the macroW model 212 creates a list of candidate nodes where this PE is "ready to run". The "ready to run" list for a PE should be balanced. One cannot grossly over-provision each PE due to limited resources.

On the other hand the macroW model 212 needs to allocate enough resources so that the scheduler can deal with the variations in demands. One goal of macroW 212 is to find such a balanced allocation. In particular, the output of macroW 212 is an assignment of PE to PNs. If a PE is assigned to a PN, this means that this PE is allowed to run on that PN. This assignment needs to respect various constraints, so that the scheduler does not incur problems when it is time to actually run a PE on a PN.

At a high level these constraints may include:

Processing Requirement constraints: For each PE, macroW 212 receives as input from MacroQ 210 of the amount of processing (in mips) that the PE needs. In addition, each PN has a limit on how much processing power it can provide. The assignment should meet these requirements.

Resource Matching constraints: For each PE there is a list of PNs where this PE can run. The assignment has to agree with (that is, be a subset of) this list.

Traffic constraints: This is a stream based computer system, and network traffic due to communication among PEs is one important issue that needs to be handled carefully. The traffic cannot exceed the network capacities.

Licensing constraints: Various PEs may run different pieces of software which need licenses. If a PE is assigned to a PN, then all the needed licenses should be present on that PN. There is usually a limit of the number of licenses available for each piece of software, and the assignment respects this limit.

Security constraints: Since data processed by the PEs is often confidential (and in particular there are different levels of this confidentiality) there are some natural security and privacy constraints.

Memory constraints: The total memory used by PEs assigned to a PN should respect the available memory at that PN.

Limited incremental changes: There is overhead involved in preparing a PN for a PE. The solution produced by macroW 212 should not deviate significantly from one macro epoch to another.

At a high level the design of macroW 212 can be summarized as follows:

To scale to large numbers of PEs and PNs, a "divide and conquer" is employed. The design of macroW 212 is preferably hierarchical and there are at least two levels in the hierarchy. Suppose there are a large number of PNs. These PNs are partitioned into well connected pieces (in the sense on network connectivity) called clusters (Cl). The clusters may include a relatively smaller number of PNs. (There is a natural notion of clusters corresponding to the Ethernet Hubs based on the network architecture.)

At the top level in macroW 212, a decision is made for each PE into which of the one or more clusters the PE will be assigned. This may be done by solving an integer linear program (ILP) where there are many continuous variables but only few integer variables. (Those skilled in the art will know that ILPs are well-understood in the literature. See, for example, D. Bertsimas and J. Tsitsiklis, "Introduction to Linear Optimization", Athena Scientific, 1997.) This ILP is quite accurate and will take into account almost all of the constraints involved. Even though taking all these constraints into account for a problem on a large number of PNs could lead to a huge system of equations, embodiments of the present invention are able to solve this efficiently because the embodiments permit the PE to PN assignments to be fractional instead of binary. A detailed description of this ILP is given later.

After this phase, it is known, for each PE, the cluster(s) to which the PE will be assigned. Next, a smaller problem is solved within each cluster. However, some work needs to be done to do this. First, there is a need to know certain quantities for each cluster (which were only known globally earlier). For example, suppose there is a global quota of licenses for some piece of software. Since the present invention needs to solve the problem at a cluster level now, it needs to know how many licenses for this software can be used within that cluster. Fortunately, this information will be provided by the top level ILP. (This will need to be done for other constraints too.)

Second, the present invention needs to handle the PEs which may be allocated to several clusters, but if the top-level solution assigns a PE to multiple clusters, then the top-level solution will also give enough information about how much of a "piece" of this PE goes on each cluster. For example, it will know how many mips for this PE go to each cluster. This will permit the present invention to view each piece of a single PE assigned to different clusters as separate PEs. The (smaller) bottom level ILPs can be solved both efficiently and accurately.

The resource requirements of PEs can change dramatically in a short time frame. To handle this, each PE needs to be overallocated. However, to make sure the system is not underutilized on average, each PN needs to be overloaded on the system too. Thus, a PE will not be running on all the PNs to which it is assigned. The hope is that if some PE needs more resources than it usually needs, it can be run on the nodes to which it is assigned to by shifting the already running jobs on these nodes to other nodes. This dynamic reallocation of PEs is the job of the micro model. However, for the micro model to be able to do its job properly, the macroW model 212 needs to ensure that the PE to PN assignments are "well-connected".

The top level ILP:

The goal of the top level ILP is to decide which PE goes to which cluster(s). Of course such a decision has to take into consideration various constraints such a resource matching, licensing, traffic, processing and so on. However, these constraints are considered in a "fractional" way. Allowing these values to be fractional reduces the number of integer variables and makes the solution more efficient. Another benefit is that even if the present invention does not solve the problem to optimality, because of time constraints, it can still obtain a lot of information from the approximate solution.

The following notation will be used in the formulation.

Basic input data:

P: Set of PEs, indexed by p. These are the PEs in chosen jobs and chosen templates from the macroQ model.

N: Set of processing nodes, indexed by n.

$L_{std}$: Set of licenses for which standard constraints apply.

$L_{node}$: Set of licenses for which node locked constraints apply.

L: Set of licenses, indexed by l. These are the standard and node locked licenses.

$\pi_l$: For a license l this is the subset of PEs which require l.

E: Set of edges in network graph, indexed by e.

T: Set of traffic values for stream connected PEs. If PEs $p_i$ and $p_j$ are connected by a stream s, the traffic between these PEs is denoted $t_{ij}$.

Decision variables and other input data:

The following notation will be used in the formulation. The primary decision variables are:

$w_{pk}$: This variable is 1 if PE p is assigned to cluster k, and 0 otherwise.

$x_{pn}$: These are continuous in the range [0,1]. This variable represents the probability that PE p is assigned to PN n.

$y_{te}$: This variable is 1 if the traffic pair t contributes to the traffic on edge e in the network graph, and 0 otherwise.

The following variables are also needed:

$z_{nl}$: This variable is 1 if node-locked license l is on PN n, and 0 otherwise.

$\Delta x_{pk}$: This is the difference between the value $w_{pk}$ and the (known) value of this variable during the previous macro model epoch. Note that this is a derived decision variable.

$\Delta x_{pn}$: This is a continuous variable which denotes the difference between the value $x_{pn}$ and the (known) value of this variable during the previous macro model epoch.

l(t,e): This is a binary variable which is 1 if some PE in the traffic pair t lies to the left of the bottleneck edge e.

r(t,e): This is a binary variable which is 1 if some PE in the traffic pair t lies to the right of the bottleneck edge e.

Additional notation: The following variables are also needed:

Let $\kappa$ denote the number of clusters. For a PN n, let k(n) denote the cluster in which n lies. For a PE p, let $G_p$ denote its mips requirement from macroQ and let $\beta_p$ denote the overallocation factor.

For a PN n, let $H_n$ denote processor mips and let $\alpha_n$ be the overallocation factor. The output of a resource matcher is described by a variable $A_{pn}$, which is 1 if PE p can be placed on PN n, and 0 otherwise. $B_e$ denotes the bandwidth capacity for edge e in the network graph. E denotes the set of all bottleneck edges in the network graph.

A routing table corresponds to a tree. For an edge e in the network graph, let L(e) denote the set of clusters that lie to the left of edge e. Similarly, let R(e) denote the set of clusters that lie to the right of e. Let $\Gamma$ denote the set of all traffic pairs.

Let $k_{pn}$ denote the security risk level of running PE p on PN n. Let cl denote the budget for standard license l. Let $c_l^{node}$ denote the budget for node locked license l. Let R denote the maximum allowable risk in the computer system. Let $w_{lpn}$ denote the weight (cost) of using standard software license l on PN n for PE p. Typically, these will be 1.

Let $w_{l,n}^{node}$ denote the weight (cost) of using node locked software license l on PN n. Let $\epsilon_k$ denote the maximum number of PE to cluster reassignments allowed from the previous macro epoch. Let $\epsilon_n$ denote the maximum number of PE to PN reassignments allowed from previous macro epoch. Let $I_p$ denote the integrity level of PE p. Let $S_n$ denote the range of integrity levels allowed on the PN p.

Constraints

Consistency constraints: $x_{pn} \leq w_{p,k(n)}$: PE p can only be assigned to PN n in cluster k if $w_{pk}=1$. Resource matching constraints are enforced by $x_{pn} \leq A_{pn}$. Note that resource matching constraints will not be added explicitly. They will be incorporated implicitly by defining only those variables $x_{pn}=1$ for which $A_{pn}=1$.

Processing constraints:

$$\sum_{p} \min(H_n, G_p) x_{pn} \geq \beta_p G_p.$$

For each PE p the total processing allocated is at least $\beta_p$ times its requirement.

$$\sum_{p} \min(H_n, G_p) x_{pn} \leq \alpha_p H_p.$$

Similarly for each node, the total mips assigned to it should not exceed $\alpha_p$ times its capacity.

Traffic Constraints: The variables y(tp,e) will indicate that the traffic pair tp uses edge e. The following convention may be adopted: that a pair contributes the entire traffic $t(p_1, p_2)$ to edge e, whenever $p_1$ is assigned to at least one cluster on the left of edge e and $p_2$ is assigned to at least one cluster to the right of e (or the other three symmetric cases).

There are four constraints:

$l(tp,e) \geq w(p_1,k)$ for all tp in $\Gamma$, e in E, k in L(E);

$l(tp,e) \geq w(p_2,k)$ for all tp in $\Gamma$, e in E, k in L(E);

$r(tp,e) \geq w(p_1,k)$ for all tp in $\Gamma$, e in E, k in R(E);

and $r(tp,e) \geq w(p_2,k)$ for all tp in $\Gamma$, e in E, k in R(E).

The next equation allows the present invention to express y(tp,e): $y(tp,e) \geq l(tp,e)+r(tp,e)-1$ for all tp in $\Gamma$, e in E.

Finally for each bottleneck edge e there is the constraint:

$$\sum_{tp \in \tau} t(tp) y(tp, e) \leq B_e$$

for all e in E.

Reassignment constraints: The first constraints set $\Delta w_{pk}$ and $\Delta y_{pn}$ appropriately:

$\Delta w_{pn} \leq w_{pn} - \overline{w}_{pn}$ for all p,k $\Delta w_{pk} \leq \overline{w}_{pk} - w_{pk}$ for all p,k $\Delta x_{pn} \leq x_{pn} - \overline{x}_{pn}$ for all p,k $\Delta x_{pn} \leq \overline{x}_{pn} - x_{pn}$ for all p,k The following constraints bound the total incremental change.

$$\sum_{p,k} \Delta w_{pk} \leq \varepsilon_k$$

$$\sum_{p,n} \Delta x_{pn} \leq \varepsilon_n.$$

Licensing constraints: There are two types of licenses. The standard license constraint is:

$$\sum_{p \in \pi l} \sum_n w_{lpn} x_{pn} \leq c_l.$$

There are two node-locked license constraints:
$x_{pn} \leq z_{nl}$ and $$\sum_n z_{nl} \leq c_l^{node}.$$

Security constraints: There are two requirements for security constraints:

Absolute PE integrity level constraint: For each processing node there can exist minimum and maximum PE integrity level values. All PEs which are chosen by macroW as candidates for that processing node have integrity levels which fall within this range. This constraint is trivially and directly modeled by the resource matching constraints.

Global Risk: Assigning a particular PE to a particular processing node incurs a local risk, which can be arbitrary. The sum of all such local risks can be constrained to be less than or equal to a given global security risk limit. This is imposed by the single constraint $$\sum_{p,n} x_{pn} k_{pn} \leq R.$$

Bottom Level ILPs

The bottom level ILPs have some significant differences as compared to the top level ILP. First, the PE to PN assignment variables $x_{pn}$ are binary instead of continuous, and there are no cluster variables. Second, the traffic constraint is not necessary. On the other hand, there is an additional (relative) security constraint. Note that now risk quotas, license quotas and reassignment quotas refer to the quota within the cluster Cl under consideration.

Basic input data:
P: Set of PEs, indexed by p.
N: Set of processing nodes, indexed by n.
$L_{std}$: Set of licenses for which standard constraints apply.
$L_{node}$: Set of licenses for which node locked constraints apply.
L: Set of licenses, indexed by l. These are the standard and node locked licenses.
$\pi_l$: For a license l this is the subset of PEs which need l.
Decision variables and other input data:
Basic input data:
The primary decision variable is:
$x_{pn}$: This variable is 1 if PE p is assigned to PN n, and 0 otherwise.
The following decision variables are also needed:
$z_{nl}$: This variable is 1 if node-locked license l is on PN n, and 0 otherwise.
$\Delta x_{pn}$: This is a continuous variable which denotes the difference between the value $x_{pn}$ and the (known) value of this variable during the previous macro model epoch.
$s_n$: This is the maximum integrity level assigned to node n, a continuous variable.

Additional notation:

For a PE p, let $G_p$ denote its mips requirement from macroQ and let $\beta_p$ denote the overallocation factor. For a PN n, let $H_n$ denote processor mips and let $\alpha_n$ be the overallocation factor. The output of a resource matcher is described by a variable $A_{pn}$, which is 1 if PE p can be placed on PN n, and 0 otherwise. Let $k_{pn}$ denote the security risk level of running PE p on PN n. Let Cl denote the budget for standard license l. Let $c_l^{node}$ denote the budget for node locked license l. Let R denote the maximum allowable risk in the computer system. Let $w_{lpn}$ denote the weight (cost) of using standard software license l on PN n for PE p. Typically, these will be 1.

Let $w_{nl}^{node}$ denote the weight (cost) of using node locked software license l on PN n. Let $\epsilon_n$ denote the maximum number of PE to PN reassignments allowed from previous macro epoch. Let $I_p$ denote the integrity level of PE p. Let $S_{min}$ denote the minimum value of allowable integrity levels allowed on a PN. $S_{max}$ denote the maximum value of allowable integrity levels allowed on a PN.

Constraints

The constraints in the bottom level ILPs are fewer but similar to those of the top level ILP.

Consistency constraints: Resource matching constraints are enforced by $x_{pn} \leq A_{pn}$. Note that resource matching constraints will not be added explicitly. They will be incorporated implicitly by defining only those variables $x_{pn}=1$ for which $A_{pn}=1$.

Processing constraints:

$$\sum_p \min(H_n, G_p) x_{pn} \geq \beta_p G_p.$$

For each PE p the total processing allocated is at least $\beta_p$ times its requirement.

$$\sum_p \min(H_n, G_p) x_{pn} \leq \alpha_p H_p.$$

Similarly for each node, the total mips assigned to it should not exceed $\alpha_p$ times its capacity.

Reassignment constraints: The first constraints set $\Delta w_{pk}$ and $\Delta y_{pn}$ appropriately:

$\Delta w_{pn} \leq w_{pn} - \overline{w}_{pn}$ for all $p,k$ $\Delta w_{pk} \leq \overline{w}_{pk} - w_{pk}$ for all $p,k$ $\Delta x_{pn} \leq x_{pn} - \overline{x}_{pn}$ for all $p,k$ $\Delta x_{pn} \leq \overline{x}_{pn} - x_{pn}$ for all $p,k$ The following constraint bounds the total incremental change.

$$\sum_{p,n} \Delta x_{pn} \leq \varepsilon_n.$$

Licensing constraints: There are two types of licenses. The standard license constraint is:

$$\sum_{p \in \pi l} \sum_n w_{lpn} x_{pn} \leq c_l.$$

There are two node-locked license constraints: $x_{pn} \leq z_{nl}$ and $$\sum_n z_{nl} \leq c_l^{node}.$$

Security constraints: Absolute integrity level constraints are trivially and directly modeled by the resource matching constraints.

Global Risk: Assigning particular PE to a particular processing node incurs a local risk, which can be arbitrary. The sum of all such local risks can be constrained to be less than or equal to a given global security risk limit. This is imposed by the single constraint $$\sum_{p,n} x_{pn} k_{pn} \leq R..$$

Relative PE integrity level constraints: For each PN there are two constraints:

$i_p x_{pn} \geq s_n - \Delta_n^{sec} - S_{max}(1-x_{pn})$ and $i_p x_{pn} \leq s_n$.

At a high level the macroW model 212 (FIG. 5) solves two types of integer linear programs (ILPs). There is one top level ILP to make decisions on a cluster by cluster level. There is also one bottom level ILP to be solved per cluster.

Figure 7:
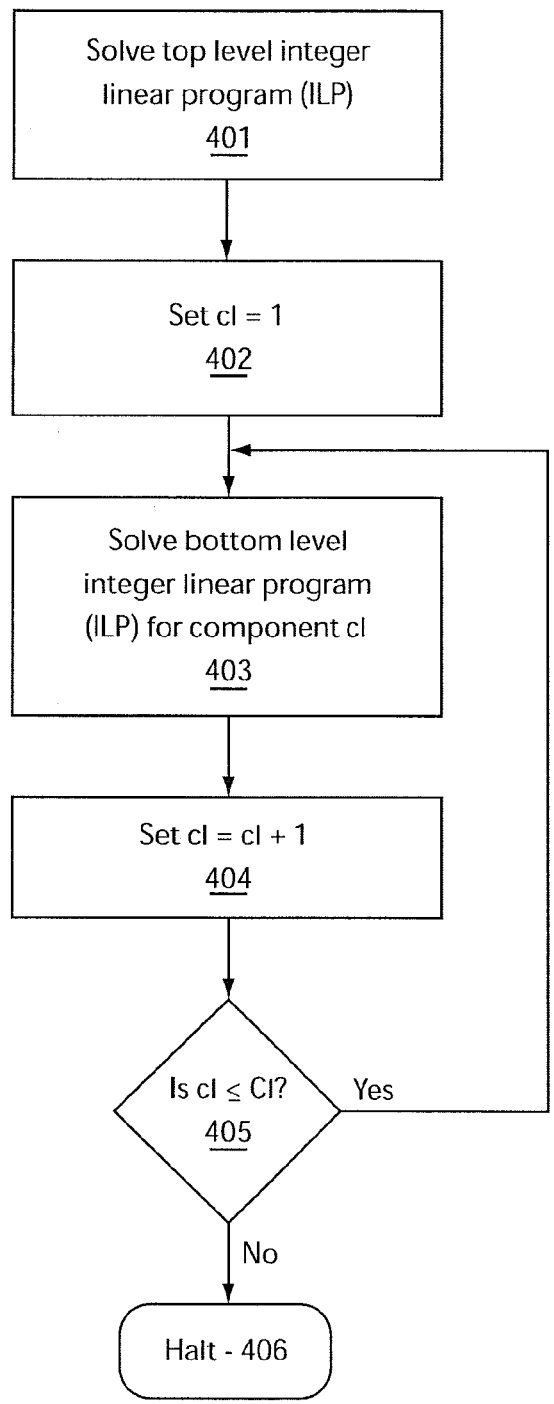
FIG. 7 is a block/flow diagram showing process steps for obtaining a solution for a macroW module in accordance with an illustrative embodiment.

Referring to FIG. 7, a flowchart of the main components of the macroW model (212) is illustratively shown. The process begins at block 401, which solves the top level integer linear program (ILP). (See, e.g., Bertsimas and Tsitiklis, referenced above.) Then, block 402 initializes a cluster number cl to be 1. In block 403, the process solves a bottom level ILP for cluster cl. Block 404 increments the value of cl by 1, and block 405 tests to see if cl is less than or equal to the number of clusters Cl. If cl is less than or equal to the number of clusters, the process returns to block 403. If not, the process halts at block 406 with a solution to the macroW problem.

Figure 8:
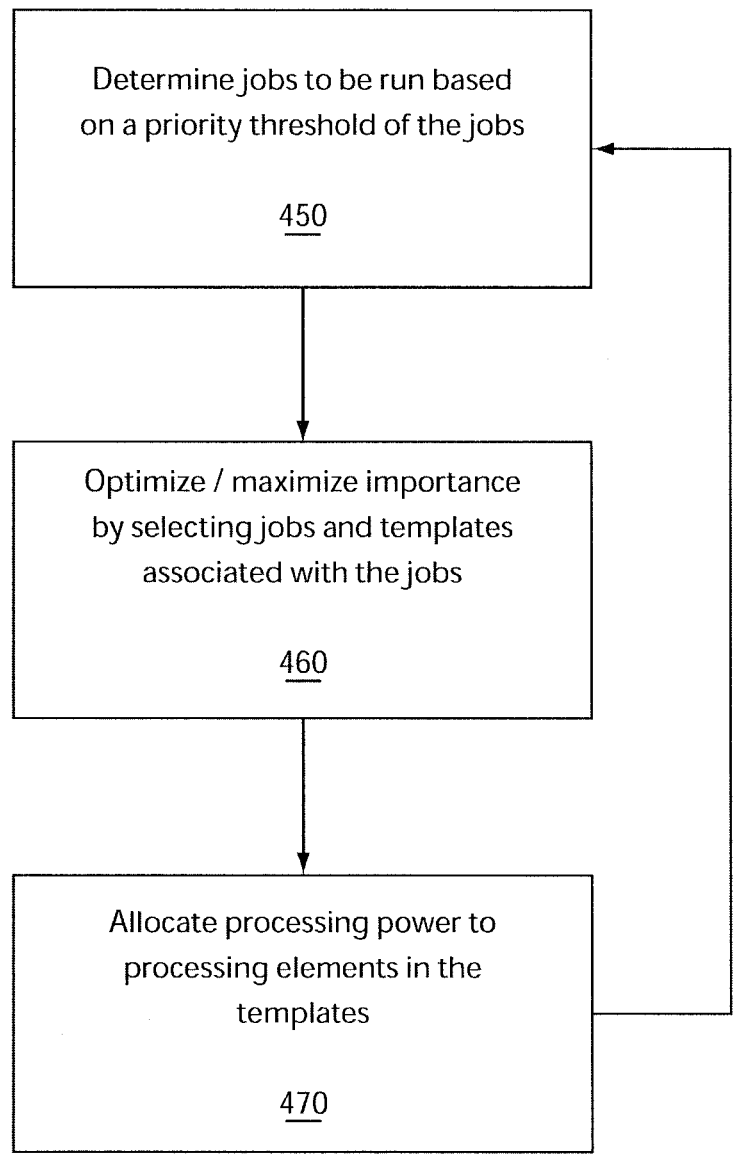
FIG. 8 is a block/flow diagram for a system/method for choosing jobs to run, templates to employ and candidate processing nodes to assign to processing elements to improve overall importance in a work scheduling environment.

Referring to FIG. 8, a block/flow diagram is illustratively shown for a method of choosing jobs to run in a stream based distributed computer system. In block 450, determining jobs to be run in a distributed stream-oriented system is performed in accordance with a priority threshold above which jobs will be accepted, below which jobs will be rejected. Projected importance is optimized by deciding which jobs to run, and which templates among running jobs to choose in block 460. In block 470, allocating appropriate processing power to processing elements in the templates of the running jobs is performed. The steps in FIG. 8 may be repeated as needed.

Figure 9:
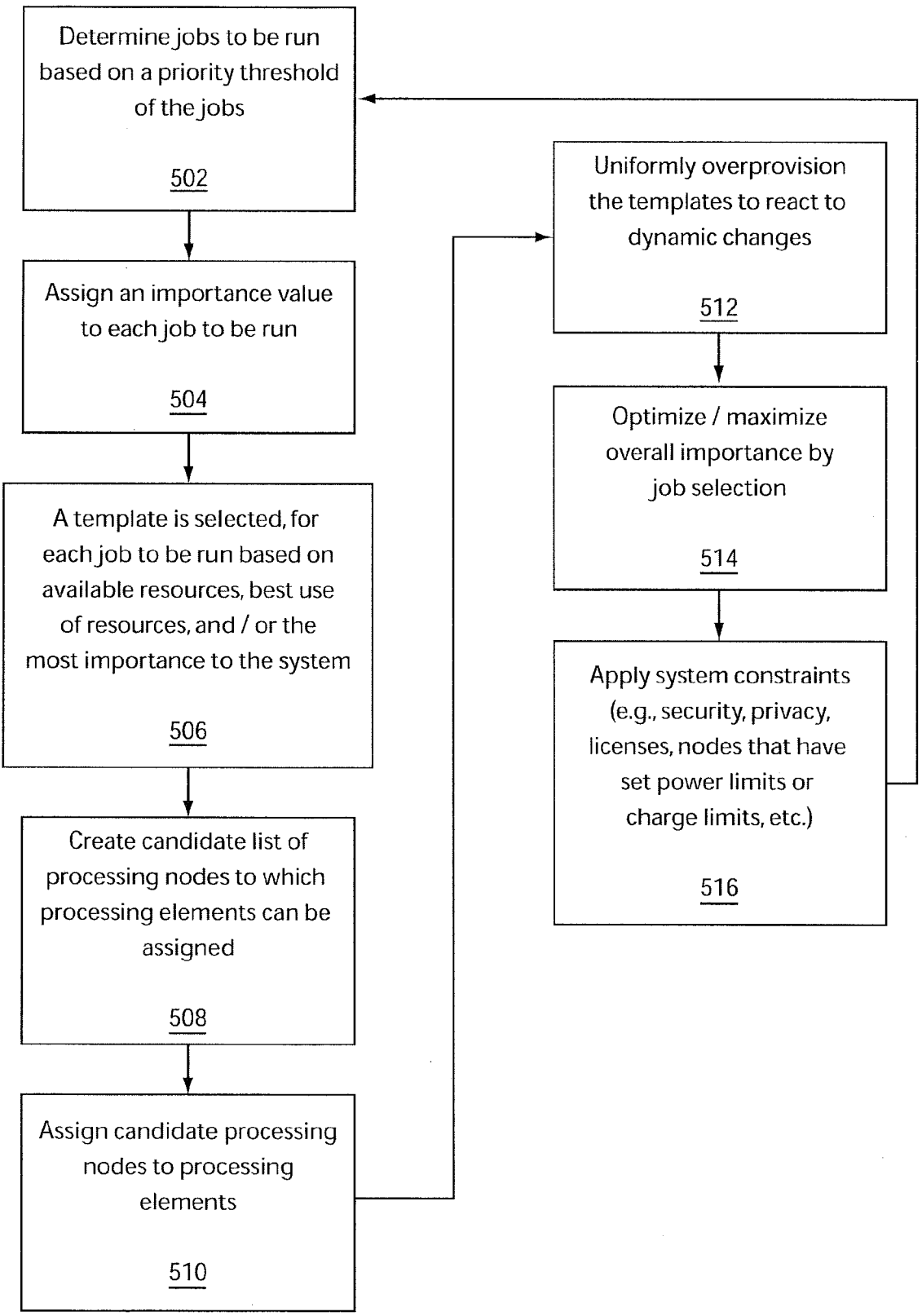
FIG. 9 is a block/flow diagram for a system/method showing greater detail than FIG. 8 for choosing jobs to run, templates to employ and candidate processing nodes to assign to processing elements to improve overall importance in a work scheduling environment.

Referring to FIG. 9, a block/flow diagram is illustratively shown for a more detailed method of choosing jobs to run in a stream based distributed computer system. In block 502, jobs to be run are determined in the distributed stream-oriented system. This includes deciding a priority threshold above which jobs will be accepted, below which jobs will be rejected.

In block 504, importance values are assigned to each job based on a priority of a stream associated with the job or other criteria. This may performed at any time. In block 506, a template is selected, for each job to be run, from a plurality of alternative templates. The template may be selected by deciding an amount of resources that a job will be permitted to use. The template is selected which best utilizes that amount of resources, and produces the most importance to the system.

In block 508, a list of candidate processing nodes is determined to handle processing elements for the jobs to be run. In block 510, candidate processing nodes may be assigned to processing elements of the template. Uniform overprovisioning of the template may be performed to react robustly to dynamic changes in importance, jobs, and streams to minimize network utilization among candidate nodes, in block 512.

In block 514, overall importance is optimized/maximized relative to the priority threshold based on importance values assigned to all jobs by selecting a job set that with the highest importance. This process is performed throughout the method. In block 516, system constraints are applied to ensure jobs meet set criteria. The constraints may include security, licensing, privacy, limits on candidate processing nodes which cannot be modified, rules for a maximum amount of change permitted to assignments to the candidate processing nodes, and other constraints. These constraints may be applied at various times throughout the method. The steps in FIG. 9 may be repeated as needed.

Having described preferred embodiments of method and apparatus for assigning candidate processing nodes in a stream-oriented computer system (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method of choosing jobs to run in a stream based distributed computer system, comprising:

determining jobs to be run in a distributed stream-oriented system in accordance with a priority threshold above which jobs will be accepted, below which jobs will be rejected, to maximize projected importance by:

deciding with a processor which jobs to run, and which templates among running jobs to choose; and allocating appropriate processing power to processing elements in the templates of the running jobs.

2. The method as recited in claim 1, wherein deciding includes determining a list of candidate processing nodes to handle processing elements for the jobs to be run.

3. The method as recited in claim 1, further comprising assigning importance values to each job based on a priority of a stream associated with the job.

4. The method as recited in claim 1, wherein the constraints include at least one of limits on candidate processing nodes which cannot be modified, and rules for a maximum amount of change permitted to assignments to the candidate processing nodes.

5. The method as recited in claim 1, wherein allocating appropriate processing power includes selecting the template which best utilizes an amount of resources, and produces the most importance to the system.

6. The method as recited in claim 1, further comprising: assigning candidate processing nodes to processing elements of the template.

7. The method as recited in claim 1, further comprising: uniformly overprovisioning the template to react robustly to dynamic changes in importance, jobs, and streams to minimize network utilization among candidate nodes.

8. The method as recited in claim 1, further comprising: periodically repeating said determining.

9. A computer program product comprising a non-transitory computer useable storage medium including a computer readable program, wherein the computer readable program when executed on a computer causes the computer to execute the steps of claim 1.

10. A method of choosing jobs to run in a stream based distributed computer system, comprising:

determining jobs to be run in a distributed stream-oriented system in accordance with a priority threshold above which jobs will be accepted, below which jobs will be rejected, to maximize projected importance responsive to changing importance values by:

deciding with a processor which jobs to run, and which templates among running jobs to choose; and allocating appropriate processing power to processing elements in the templates of the running jobs.

11. The method as recited in claim 10, further comprising: periodically repeating said determining.

12. A system for scheduling stream-based applications in a distributed computer network, comprising:

a scheduler configured to schedule work using a macro method configured to determine jobs to be run in a distributed stream-oriented system in accordance with a priority threshold above which jobs will be accepted, below which jobs will be rejected, to maximize projected importance, wherein the macro method includes;

a quantity component including a processor configured to maximize importance by deciding which jobs to run, and which templates among running jobs to choose; and a where component configured to allocate appropriate processing power to processing elements in the templates of the running jobs.

13. The system as recited in claim 12, wherein the macro method is further configured to maximize projected importance responsive to changing importance values.

14. The system as recited in claim 12, wherein the scheduler is configured to periodically repeat the macro method.

15. The system as recited in claim 12, wherein the quantity component is configured to determine a list of candidate processing nodes to handle processing elements for the jobs to be run.

16. The system as recited in claim 12, wherein the scheduler is further configured to assign importance values to each job based on a priority of a stream associated with the job.

17. The system as recited in claim 12, wherein the where component is further configured to select the template which best utilizes an amount of resources, and produces the most importance to the system.

18. The system as recited in claim 12, wherein the where component is further configured to assign candidate processing nodes to processing elements of the template.

19. The system as recited in claim 12, wherein the where component is further configured to uniformly overprovision the template to react robustly to dynamic changes in importance, jobs, and streams to minimize network utilization among candidate nodes.

* * * * *